(12) United States Patent
Platero Gaona et al.

(10) Patent No.: US 9,503,008 B2
(45) Date of Patent: Nov. 22, 2016

(54) SYSTEM AND METHOD FOR MONITORING A RAPID DE-EXCITATION SYSTEM FOR SYNCHRONOUS MACHINES

(71) Applicant: UNIVERSIDAD POLITECNICA DE MADRID, Madrid (ES)

(72) Inventors: Carlos Antonio Platero Gaona, Madrid (ES);
(Continued)

(73) Assignee: UNIVERSIDAD POLITECNICA DE MADRID, Madrid (ES)

( * ) Notice: Subject to any disclaimer, the term of this patent is extended or adjusted under 35 U.S.C. 154(b) by 0 days.

(21) Appl. No.: 14/412,303

(22) PCT Filed: Jul. 5, 2013

(86) PCT No.: PCT/ES2013/000160
§ 371 (c)(1),
(2) Date: Dec. 31, 2014

(87) PCT Pub. No.: WO2014/009576
PCT Pub. Date: Jan. 16, 2014

(65) Prior Publication Data
US 2015/0188470 A1 Jul. 2, 2015

(30) Foreign Application Priority Data

Jul. 9, 2012 (ES) .................................. 201231071

(51) Int. Cl.
*H02P 27/00* (2006.01)
*H02P 9/30* (2006.01)
(Continued)

(52) U.S. Cl.
CPC ............... *H02P 9/302* (2013.01); *H02K 19/26* (2013.01); *H02P 9/12* (2013.01); *H02P 25/026* (2013.01); *H02P 25/03* (2016.02)

(58) Field of Classification Search
CPC .................... H02P 9/302; H02P 25/021; H02P 25/08; F01D 15/10; F01D 2220/50
(Continued)

(56) References Cited

U.S. PATENT DOCUMENTS

| 4,032,835 A | 6/1977 | Finnell et al. |
| 4,152,636 A | 5/1979 | Gorden |

(Continued)

FOREIGN PATENT DOCUMENTS

| CN | 101702609 A | 5/2010 |
| CN | 102130442 | 7/2011 |

(Continued)

*Primary Examiner* — Eduardo Colon Santana
*Assistant Examiner* — Gabriel Agared
(74) *Attorney, Agent, or Firm* — Lucas & Mercanti, LLP

(57) ABSTRACT

A system and method for monitoring a rapid de-excitation system for synchronous machines with indirect excitation, via an exciter machine and a rotating rectifier bridge includes means for measuring the current and voltage of the stator of a synchronous machine, means for measuring the excitation current of the exciter machine, estimation means for obtaining the estimated excitation current of the exciter machine from the current and voltage values measured in the stator of the synchronous machine, a module for comparing the measured excitation current Imed with the estimated excitation current Iest, in such a way that there is either incorrect operation if Imed >k*Iest+A, where k and A are real numbers determined on the basis of each machine, or else there is correct operation.

6 Claims, 4 Drawing Sheets

(72) Inventors: Ricardo Granizo Arrabe, Madrid (ES);
Emilio Rebollo Lopez, Madrid (ES);
Francisco Blanquez Delgado, Madrid (ES)

(51) Int. Cl.
*H02P 9/12* (2006.01)
*H02K 19/26* (2006.01)
*H02P 25/02* (2016.01)

(58) Field of Classification Search
USPC .......................................................... 318/717
See application file for complete search history.

(56) References Cited

U.S. PATENT DOCUMENTS

| | | | | |
|---|---|---|---|---|
| 2005/0007044 | A1* | 1/2005 | Qiu | H02P 21/13 318/400.02 |
| 2007/0159140 | A1* | 7/2007 | Garces | H02P 9/302 322/59 |
| 2009/0290394 | A1* | 11/2009 | Cordes | H02M 7/537 363/126 |
| 2011/0298430 | A1* | 12/2011 | Platero Gaona | H02P 9/10 322/59 |
| 2013/0128394 | A1* | 5/2013 | Spannhake | H02P 9/10 361/33 |
| 2013/0207589 | A1* | 8/2013 | Margner | B60L 11/02 318/717 |

FOREIGN PATENT DOCUMENTS

| | | |
|---|---|---|
| ES | 2325729 B3 | 9/2009 |
| GB | 928883 A | 6/1963 |
| WO | WO 2010/094818 | 8/2010 |

\* cited by examiner

1 - Synchronous Machine (SM)
2 - Exciter Machine (EM)
3 - Rotating Components
4 - Stator of SM
5 - Inductor Winding of SM
6 - Inductor Winding of EM 7 - Inductor Winding of EM
8 - Rotating Rectifier Bridge
9 - Manoeeuvre Element (ME)
10 - De-excitation Impedance
11 - Control Circuit of ME

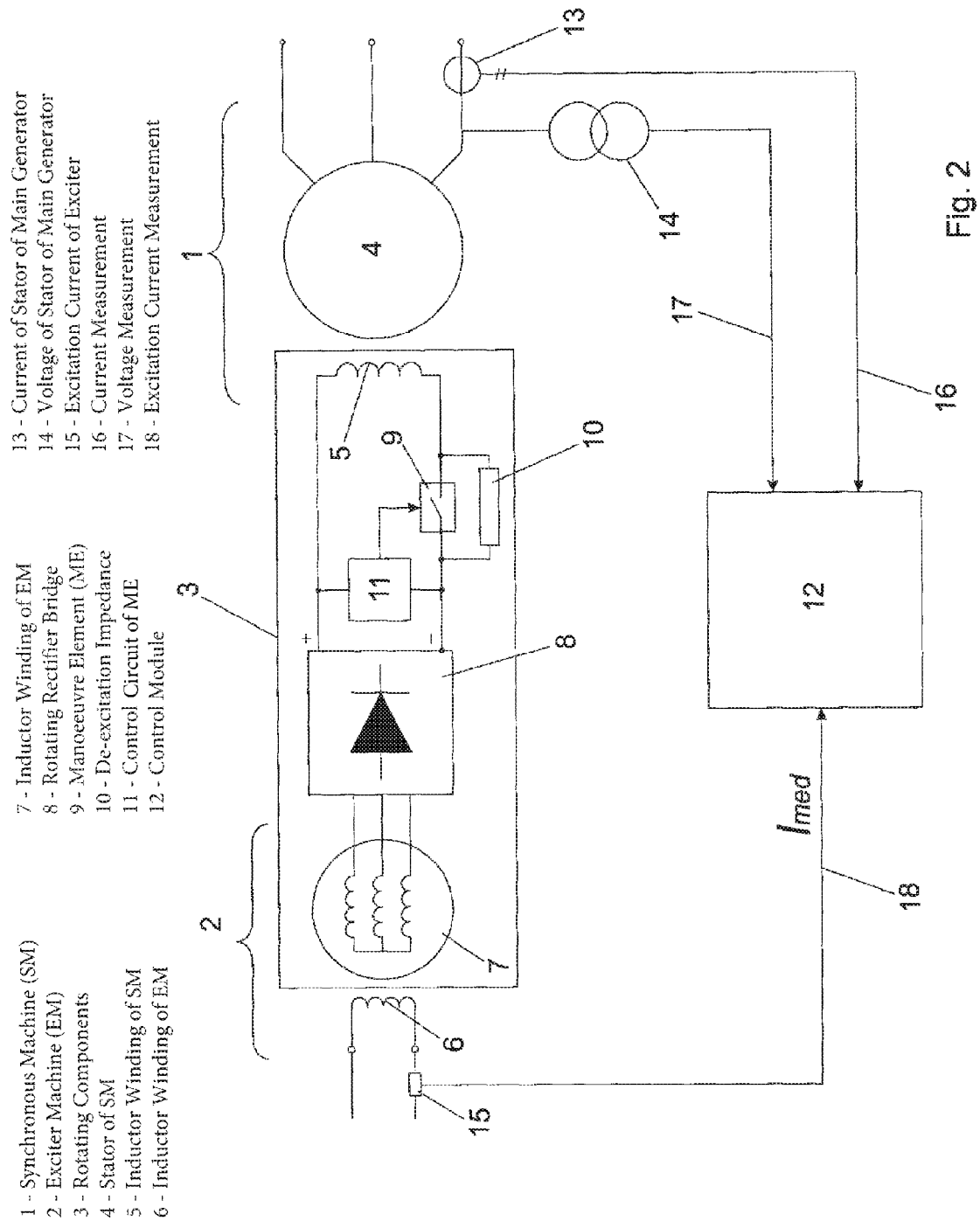

Fig. 2

1 - Synchronous Machine (SM)
2 - Exciter Machine (EM)
3 - Rotating Components
4 - Stator of SM
5 - Inductor Winding of SM
6 - Inductor Winding of EM
7 - Inductor Winding of EM
8 - Rotating Rectifier Bridge
9 - Manoeuvre Element (ME)
10 - De-excitation Impedance
11 - Control Circuit of ME
12 - Control Module
13 - Current of Stator of Main Generator
14 - Voltage of Stator of Main Generator
15 - Excitation Current of Exciter
16 - Current Measurement
17 - Voltage Measurement
18 - Excitation Current Measurement 12 - Control Module
16 - Current Measurement
17 - Voltage Measurement
18 - Excitation Current Measurement
19 - Estimated Excitation Current
20 - Comparison
24 - Estimation Module
28 - Comparison Module 12 - Control Module
16 - Current Measurement
17 - Voltage Measurement
18 - Excitation Current Measurement
19 - Estimated Excitation Current
20 - Comparison
21 - Value of Active Power
22 - Effective Voltage Value
23 - Value of Reactive Power
24 - Estimation Module
25 - Multiplier
26 - Adjustable Timer
27 - System Output Signal

SYSTEM AND METHOD FOR MONITORING A RAPID DE-EXCITATION SYSTEM FOR SYNCHRONOUS MACHINES

CROSS REFERENCE TO RELATED APPLICATION

This Application is a 371 of PCT/ES2013/000160 filed on Jul. 5, 2013 which, in turn, claimed the priority of Spanish Patent Application No. P201231071 filed on Jul. 9, 2012, both applications are incorporated herein by reference.

FIELD OF THE INVENTION

The present invention aims to present a new system for monitoring the correct operation of the rapid de-excitation system for synchronous machines with indirect excitation by means of rotating diodes described in patent ES2325729-B2 and in patent application PCT/ES2010/000058.

This monitoring system serves to protect the de-excitation system in the event of the same operating poorly during the usual operation of the machine.

BACKGROUND OF THE INVENTION

The rapid de-excitation system for synchronous machines with indirect excitation described in patent ES2325729 successfully improves dynamic response and safety when it comes to de-exciting the machine, which means that in the event of an internal short circuit, the machine would be damaged to a much lesser extent.

During usual operation, the manoeuvre element in the de-excitation system should be connected and current should barely circulate through the de-excitation resistor. In the event of this system operating poorly, the manoeuvre element would not drive, thus meaning the excitation current must circulate through the de-excitation resistor. In this case, the machine may be damaged as a result of overheating in the de-excitation resistor.

Furthermore, in the event of poor operation, in order for a certain current to continue circulating through the excitation winding of the main generator, the excitation current of the excitation winding of the exciter must be increased.

As such, a monitoring system capable of determining whether or not the rapid de-excitation system is operating correctly becomes necessary, i.e. a system capable of determining whether or not the manoeuvre element drives during normal operation.

DESCRIPTION OF THE INVENTION

The present invention relates to a system and method for monitoring a rapid de-excitation system for synchronous machines with indirect excitation, capable of determining whether or not said rapid de-excitation system is operating correctly. In order to do so, it requires information on the excitation current of the excitation winding of the exciter, on the voltage and on the current in the stator of the main synchronous machine.

This is based on comparing the value of the excitation current of the exciter with a value calculated from the average current and voltage of the stator of the synchronous machine if the excitation current of the exciter is much higher than the current calculated, this indicates that the de-excitation system is not operating correctly, i.e. it is not driving the manoeuvre element (9).

A first aspect of the present invention relates to a monitoring system for monitoring a rapid de-excitation system for synchronous machines with indirect excitation, via an exciter machine and rotating rectifier bridge. The system comprises:
- means for measuring the current of the stator pertaining to the synchronous machine;
- means for measuring the voltage of the stator of the synchronous machine;
- means for measuring the excitation current of the exciter machine;
- estimation means responsible for obtaining the estimated excitation current of the exciter machine, from the average current and voltage values in the stator of the synchronous machine;
- a module for comparing the measured excitation current Imed with the estimated excitation current Iest, the result of said comparison containing information on the correct or incorrect operation of the rapid de-excitation system, in such a way that:
  there is either incorrect operation if Imed>k*Iest+A, where k and A are real numbers determined on the basis of each machine;
  or else there is correct operation.

Another aspect of the present invention includes a method for monitoring a rapid de-excitation system for synchronous machines with indirect excitation, via an exciter machine and rotating rectifier bridge. This method comprises:
- measuring the current of the stator of the synchronous machine;
- measuring the voltage of the stator of the synchronous machine;
- measuring the excitation current of the exciter machine;
- obtaining the estimated excitation current of the exciter machine from the current and voltage values measured in the stator of the synchronous machine;
- comparing the measured excitation current Imed with the estimated excitation current Iest, the result of said comparison containing information on the correct or incorrect operation of the rapid de-excitation system, in such a way that:
  there is either incorrect operation if Imed >k*Iest+A, where k and A are real numbers determined on the basis of each machine;
  or else there is correct operation.

The excitation current is preferably estimated by means of the non-saturated synchronous machine model.

The excitation current may be estimated by means of previous tests on the synchronous machine and exciter machine.

BRIEF DESCRIPTION OF THE DRAWINGS

Below is a very brief description of a series of drawings, which serve to better understand the invention and relate expressly to an embodiment thereof, presented as a non-limiting example of the same.

FIG. 2 is a schematic view of the rapid de-excitation system shown in the previous Figure, with the monitoring system object of the present invention.

PREFERRED EMBODIMENT OF THE INVENTION

Figure 1:
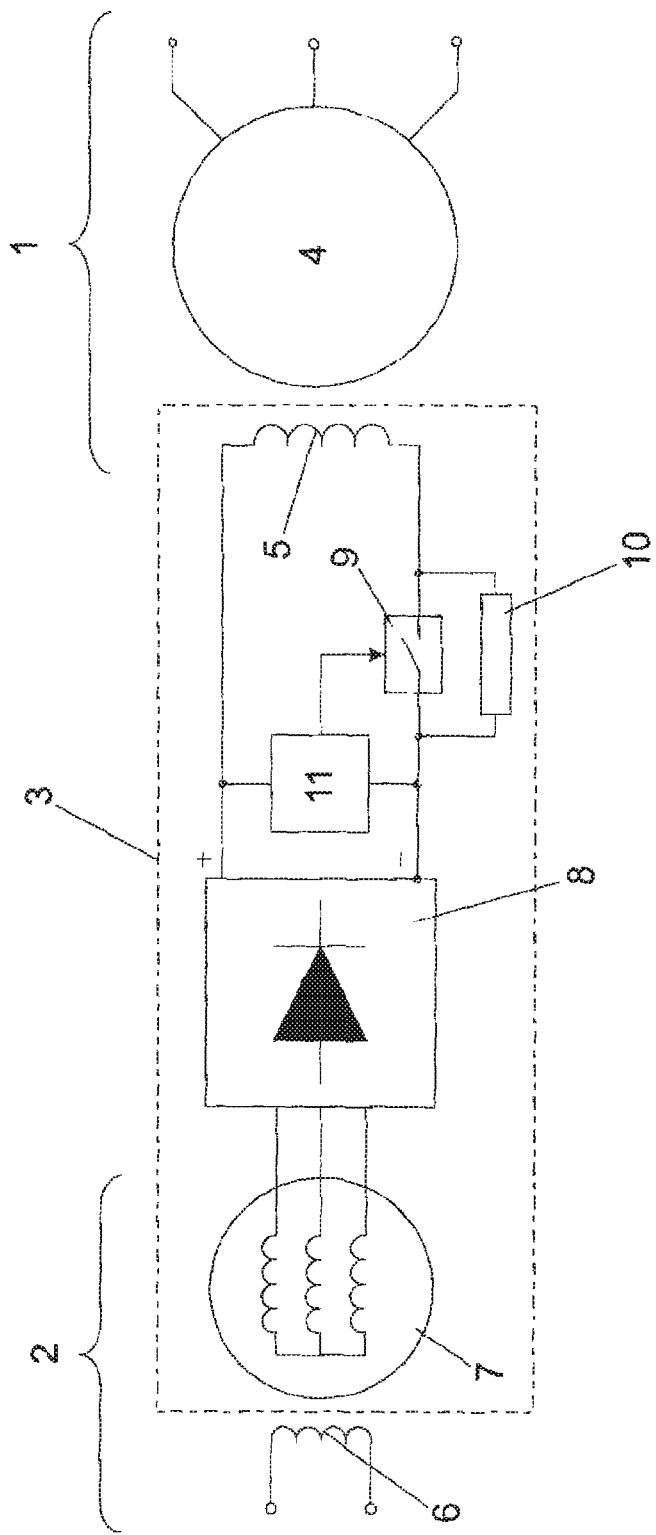
FIG. 1 is a schematic view of a rapid de-excitation system for synchronous machines with indirect excitation, according to the state of the art, for which the monitoring system of the present invention is designed.

FIG. 1 is a schematic view of the rapid de-excitation system for synchronous machines with indirect excitation employed in patent ES2325729-B2, wherein the following references are employed:

Synchronous machine (1);
Exciter machine (2);
Rotating components (3);
Stator (4) of the synchronous machine (1);
Inductor winding (5) of the synchronous machine (1);
Inductor winding (6) of the exciter machine (2);
Inductor winding (7) of the exciter machine (2);
Rotating rectifier bridge (8);
Manoeuvre element (9);
De-excitation impedance (10);
Control circuit (11) of the manoeuvre element (9).

FIG. 2 is a schematic view of the monitoring system object of the present invention patent, installed in the rapid de-excitation system shown in FIG. 1. The monitoring system of the rapid de-excitation system comprises:

a control module (12);
means for measuring the current (13) of the stator of the main generator;
means for measuring the voltage (14) of the stator of the main generator and;
means for measuring the excitation current (15) of the exciter.

The control module (12) receives the current measurement (16) in the stator of the main generator, the voltage measurement (17) of the main generator and the excitation current measurement (18) of the exciter.

Figure 3:
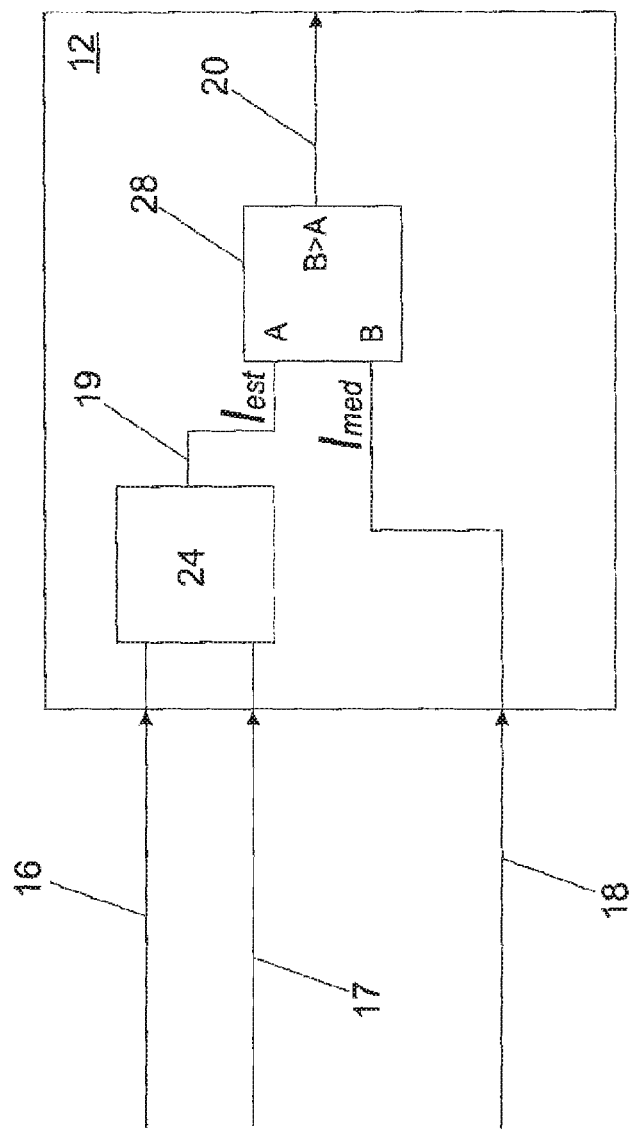
FIG. 3 is a block diagram representing the inside of the control module of the monitoring system object of the present invention.

FIG. 3 is a block diagram of the inside of the monitoring system control module. An estimation module, i.e. estimation means (24), is responsible for obtaining the estimated excitation current (19) of the exciter of the main synchronous machine, from the current measured (16) in the stator of the main generator and the voltage (17) of the stator measured in the main generator.

A multitude of synchronous machine modules exist in the technical background literature for calculating excitation current.

The monitoring system works on an operational principle based on comparison, made by a module (28) for comparing the excitation current (18) of the exciter measured and the estimated excitation current (19). The result of the comparison (20) is a logical signal containing information on the correct or incorrect operation of the rapid de-excitation system. During correct operation, the measured excitation current (18) and the estimated (19) excitation current should be similar, whilst during incorrect operation, the measured excitation current (18) would be much greater than the estimated excitation current (19).

Figure 4:
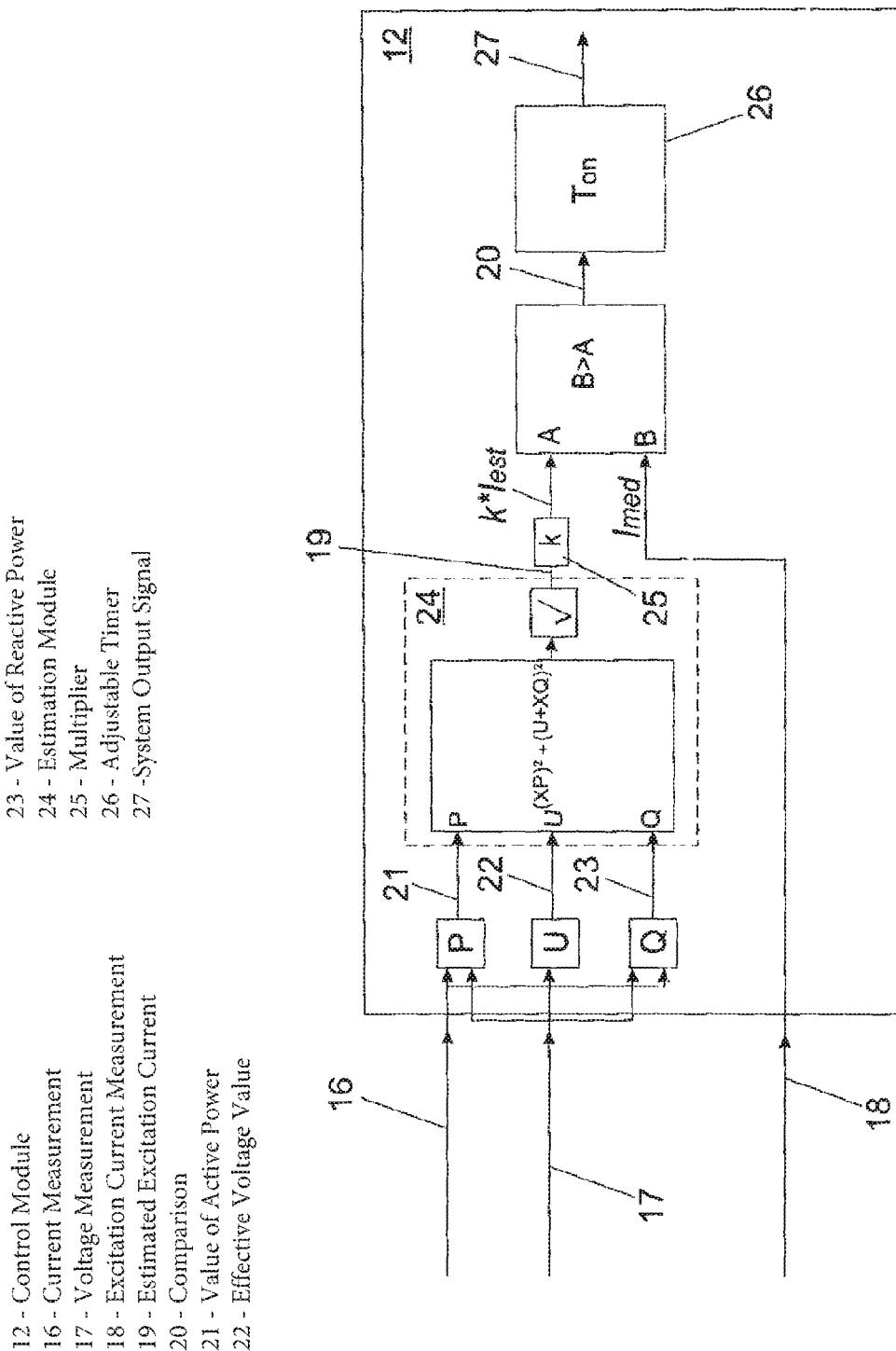
FIG. 4 represents a preferred embodiment of the control module of the monitoring system object of the present invention.

FIG. 4 represents a preferred embodiment of the control module (12) of the monitoring system. The preferred embodiment is based on estimating the excitation current of the exciter, using the non-saturated synchronous machine model. In order to do so, we must know the synchronous reactance value of the main synchronous machine $X_d$.

Using the current (16) and voltage (17) measurements taken in the stator (4) of the main synchronous machine (1), the effective voltage value (22), the value of the active power (21) and the value of the reactive power (23) are calculated from the corresponding measurement elements (P, U, Q), all of these values being expressed in unitary magnitudes (per unit).

In this case, the estimated excitation current (19) may be calculated simply, using the following equation:

$$I_f = \sqrt{(X_d P)^2 + (U + X_d Q)^2}$$

Where:
$I_f$ Is the estimated excitation current [pu];
$X_d$ Represents the synchronous reactance of the main synchronous machine in [pu];
P Is the active power of the main synchronous machine in [pu];
Q Is the reactive power of the main synchronous machine in [pu];
U Is the voltage in the armature (stator) of the main synchronous machine in [pu].

The value of the excitation current of the exciter measured (18) may be much higher than the value of the estimated excitation current (19), in the event of a fault. This will depend on the value of the de-excitation impedance (10). As such, before making the comparison, the estimated value must be increased, multiplying it by a factor of k by means of a multiplier (25). This factor k depends on the type of machine.

Once the comparison between both the estimated and measured values has been made, a logical signal (20) is activated, which indicates poor operation of the de-excitation system. This signal should be activated in enough time to be able to activate the system output signal (27). This is achieved owing to an adjustable timer (26).

It must be noted that there are a multitude of embodiments that differ from the preferred embodiment shown in FIG. 4. For example, the way in which the comparison is made may vary, the multiplier (25) and the timer (26) constituting non-essential elements of the invention. The excitation current may also be estimated in different ways, for example by conducting prior tests on the synchronous machine (1) and the exciter machine (2), taking prior active and reactive power measurements, alongside excitation current measurements, in such a way that it is possible to determine the value the excitation current should be in all operative conditions. What is important, in any case, is making an estimation of the excitation current of the exciter machine (2), measuring said current and comparing both results. The existence or non-existence of correct operation in the rapid de-excitation system is determined according to said comparison.

The invention claimed is:

1. A system for monitoring a rapid de-excitation system for synchronous machines with indirect excitation, via an exciter machine and a rotating rectifier bridge, comprising:
   a first measuring device for measuring a current of a stator of a synchronous machine;
   a second measuring device for measuring a voltage of the stator of the synchronous machine;
   a third measuring device for measuring an excitation current of an exciter machine;
   a first device for obtaining an estimated excitation current of the exciter machine from current and voltage values measured in the stator of the synchronous machine;
   a second device for comparing the measured excitation current Imed with the estimated excitation current Iest, a result of said comparing containing information on a correct or incorrect operation of a rapid de-excitation system, in such a way that:

there is either incorrect operation if Imed>k*Iest+A, where k and A are real numbers determined on the basis of each machine, wherein k and A are two constants in a linear equation that defines a relationship between Imed and Iest;

or else there is correct operation.

2. The system according to claim 1, wherein the excitation current is estimated by means of a non-saturated synchronous machine model.

3. The system according to claim 1, wherein the excitation current is estimated by means of prior testing of the synchronous machine and the exciter machine.

4. A method for monitoring a rapid de-excitation system for synchronous machines with indirect excitation, via an exciter machine and a rotating rectifier bridge, comprising:

measuring, by a first measuring device, a current of a stator of a synchronous machine;

measuring, by a second measuring device, a voltage of the stator of the synchronous machine;

measuring, by a third measuring device, an excitation current of the exciter machine;

obtaining, by a first device, an estimated excitation current of the exciter machine from current and voltage values measured in the stator of the synchronous machine; and comparing, by a second device, the measured excitation current Imed with the estimated excitation current Iest, a result of said comparing containing information on a correct or incorrect operation of a rapid de-excitation system, in such a way that:

there is either incorrect operation if Imed>k*Iest+A, where k and A are real numbers determined on the basis of each machine, wherein k and A are two constants in a linear equation that defines a relationship between Imed and Iest;

or else there is correct operation.

5. The method according to claim 4, wherein the excitation current is estimated by means of a non-saturated synchronous machine model.

6. The method according to claim 4, wherein the excitation current is estimated by means of prior testing of the synchronous machine and the exciter machine.

* * * * *